(12) United States Patent
Zimmerman et al.

(10) Patent No.: US 7,239,038 B1
(45) Date of Patent: Jul. 3, 2007

(54) APPARATUS FOR ELECTRICAL SIGNAL GENERATION BASED UPON MOVEMENT AND ASSOCIATED METHODS

(75) Inventors: Kurt Alan Zimmerman, Indialantic, FL (US); Robert Francis Meehan, Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 30 days.

(21) Appl. No.: 11/303,346

(22) Filed: Dec. 16, 2005

(51) Int. Cl.
  *F03B 13/12* (2006.01)
(52) U.S. Cl. .............................. 290/54; 290/42; 290/43; 290/53
(58) Field of Classification Search .................. 290/42, 290/43, 44, 53, 54, 55
  See application file for complete search history.

(56) References Cited

U.S. PATENT DOCUMENTS

| | | | |
|---|---|---|---|
| 3,231,749 A * | 1/1966 | Hinck, III ..................... | 290/53 |
| 3,696,251 A | 10/1972 | Last et al. ..................... | 290/53 |
| 3,758,788 A * | 9/1973 | Richeson ...................... | 290/42 |
| 3,970,939 A * | 7/1976 | Willis .......................... | 340/307 |
| 4,256,971 A * | 3/1981 | Griffith ........................ | 290/53 |
| 4,279,124 A | 7/1981 | Schremp ....................... | 60/505 |
| 4,344,004 A | 8/1982 | Okubo ......................... | 307/400 |
| 4,352,023 A * | 9/1982 | Sachs et al. ................... | 290/42 |
| 4,412,417 A | 11/1983 | Dementhon ................... | 60/497 |
| 4,423,334 A | 12/1983 | Jacobi et al. .................. | 290/53 |
| 4,438,343 A * | 3/1984 | Marken ........................ | 290/53 |
| 4,469,955 A * | 9/1984 | Trepl, II ....................... | 290/53 |
| 4,631,921 A * | 12/1986 | Linderfelt ..................... | 60/501 |
| 4,781,023 A | 11/1988 | Gordon ........................ | 60/506 |
| 4,851,704 A * | 7/1989 | Rubi ........................... | 290/53 |
| 5,411,377 A | 5/1995 | Houser et al. ............... | 417/333 |
| 5,450,049 A | 9/1995 | Bachmann .................. | 335/205 |
| 6,250,798 B1 | 6/2001 | Brainard et al. ............. | 368/180 |
| 6,327,994 B1 | 12/2001 | Labrador ..................... | 114/382 |
| 6,392,314 B1 | 5/2002 | Dick ........................... | 290/53 |
| 6,647,716 B2 | 11/2003 | Boyd .......................... | 60/398 |
| 6,781,270 B2 | 8/2004 | Long .......................... | 310/90.5 |
| 6,936,994 B1 | 8/2005 | Gimlan ....................... | 320/101 |
| 7,105,939 B2 * | 9/2006 | Bednyak ...................... | 290/42 |

OTHER PUBLICATIONS

"PowerBuoy™ Operation", Ocean Power Technologies, pp. 1-3, available at www.oceanpowertechnologies.com/technology, Dec. 16, 2005.

* cited by examiner

*Primary Examiner*—Nicholas Ponomarenko
(74) *Attorney, Agent, or Firm*—Allen, Dyer, Doppelt, Milbrath & Gilchrist, P.A.

(57) ABSTRACT

A generator/sensor may include a pair of arcuate swing arms having respective opposing ends pivotally carried by a base so that the arcuate swing arms are transverse to one another and define a movable crossing point therebetween. A body may be carried by the arcuate swing arms at the crossing point therebetween. At least one electrical generator may be driven by relative movement between the body and the base, such as to generate electrical power or to sense movement, for example. The body may be a pendulum mass or sail responsive to fluid flow.

19 Claims, 5 Drawing Sheets

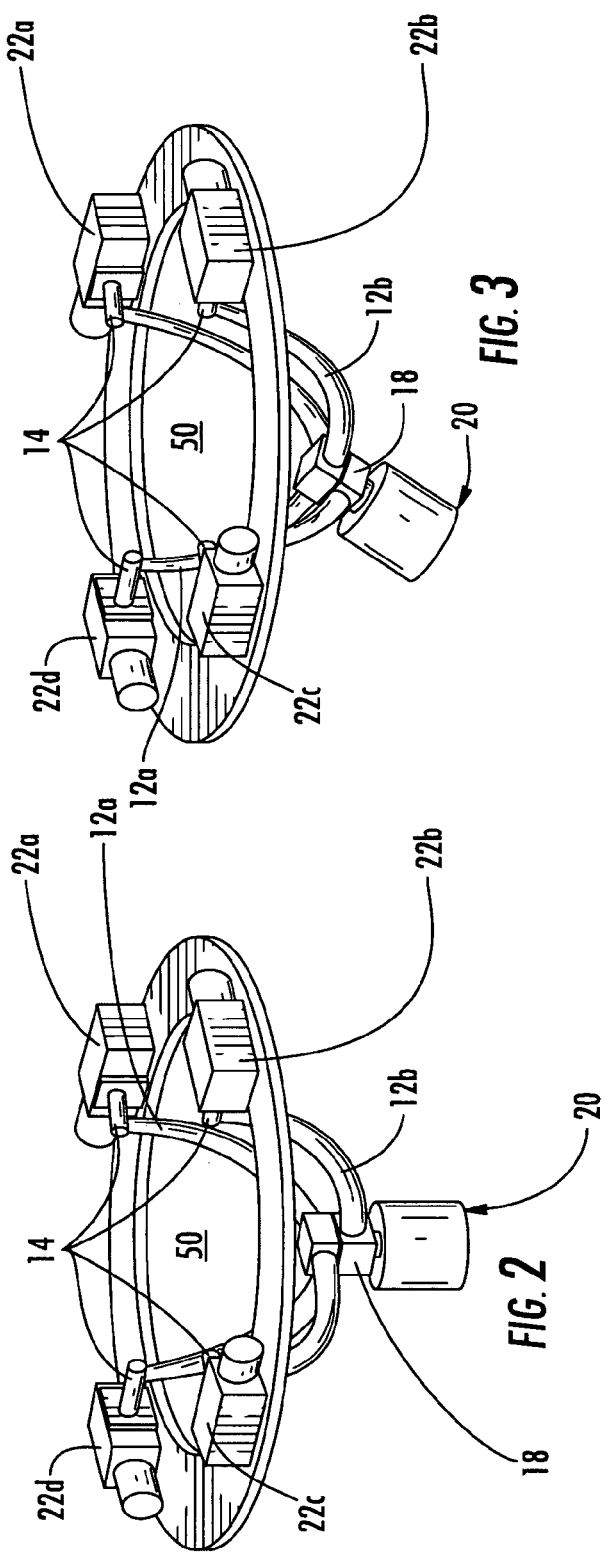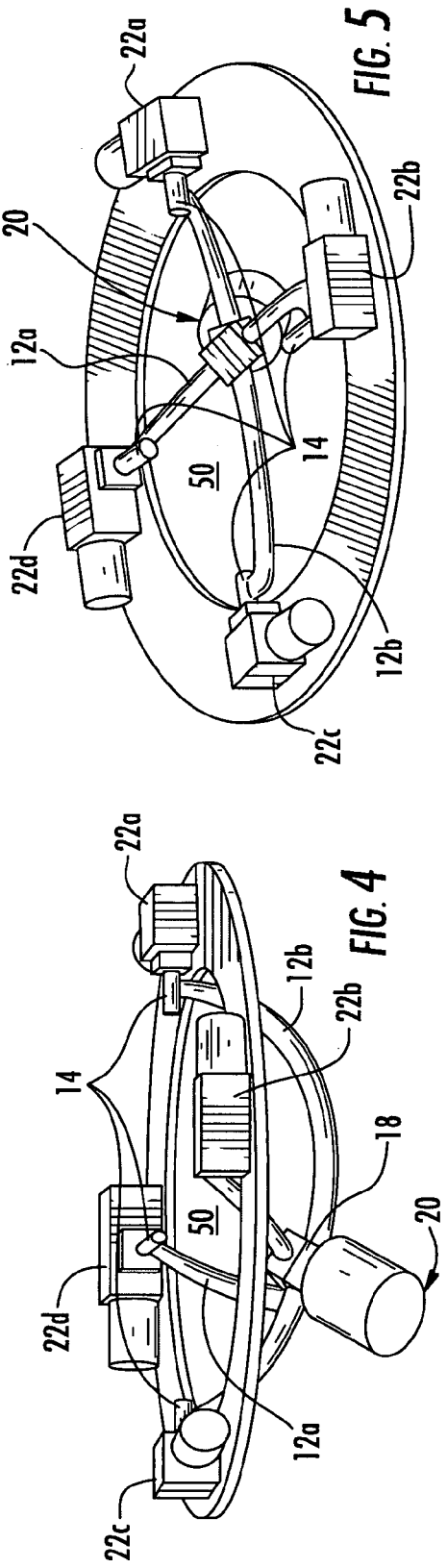

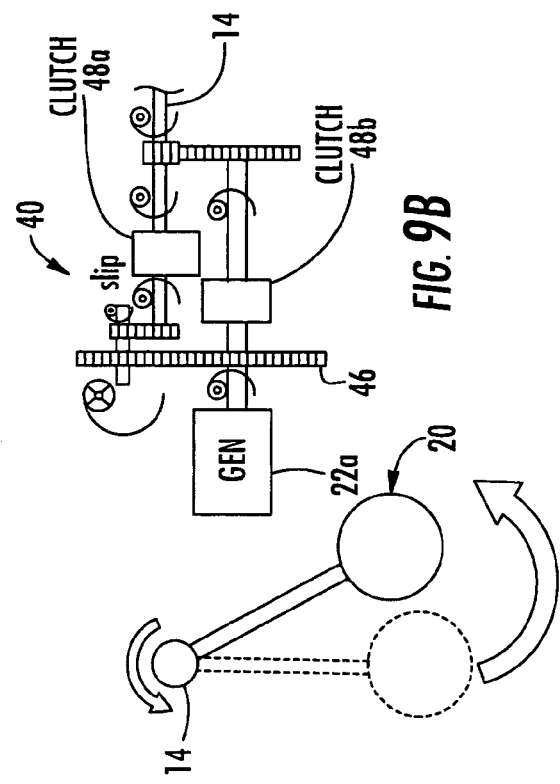
FIG. 9B
FIG. 9A
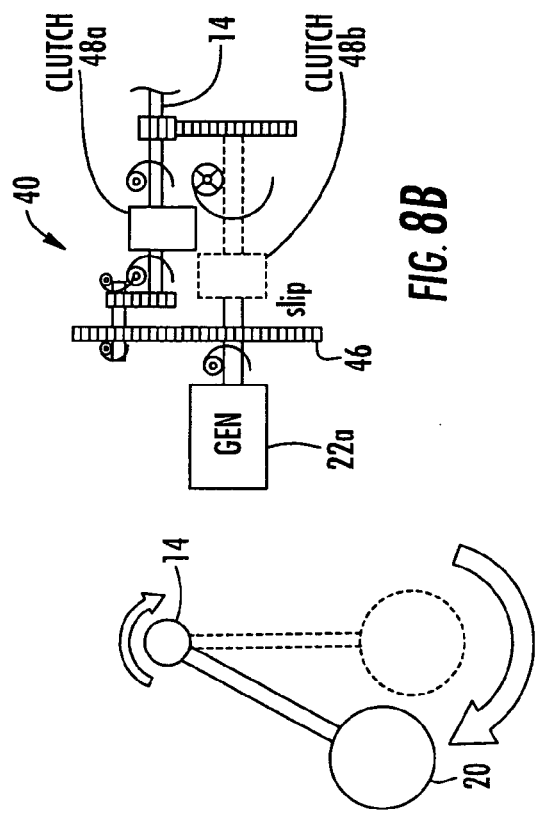
FIG. 8B
FIG. 8A

APPARATUS FOR ELECTRICAL SIGNAL GENERATION BASED UPON MOVEMENT AND ASSOCIATED METHODS

FIELD OF THE INVENTION

The invention relates to the field of generators and sensors, and, more particularly, to a generator/sensor operated by movement and related methods.

BACKGROUND OF THE INVENTION

The relative motion between two bodies may be used to generate electrical power and this technique has been used to power remote sensors such as waterway buoys. Waterway buoys range from simple channel marking devices to complex data gathering sensors that collect information such as wind speed, air temperature, water temperature, wave heights, and the like. For example, a simple channel marking device is illustrated in U.S. Pat. No. 4,423,334 to Jacobi et al. The Jacobi et al. patent discloses a spherical buoy carrying a battery and an arcuate member having two ends surrounded by magnetic loops. A body having two windings at its ends travels along the arcuate member in response to the buoy being moved by wave action. The movement of the body winding through a respective magnetic loop induces an electrical current that is used to recharge the battery.

An example of a buoy used as a complex data gathering sensor is a moored buoy in the National Data Buoy Center (NDBC) monitoring network. An NDBC buoy is part of a sensor network that is distributed throughout the U.S. waterways system to provide mariners with current and historical marine information. These buoys are typically powered by a combination of solar panels and storage batteries.

Another type of buoy that monitors the surrounding ocean conditions is the PowerBuoy™ distributed by Ocean Power Technologies, Inc. of Pennington, N.J. This buoy has a power generation system that includes a disc connected to a piston-like structure. The disc is free to rise and fall when exposed to wave action thereby actuating the piston-like structure, which drives a generator on the ocean floor for producing electricity.

U.S. Pat. No. 6,936,994 to Gimlan also discloses a buoy for generating power that includes a body coupled to a flywheel and a capacitor means. The body oscillates back and forth in the buoy in response to the buoy being moved by the water and such movement is translated by the flywheel and capacitor means to generate electrical energy.

U.S. Pat. No. 3,696,251 to Last et al. discloses a generator for deriving electrical energy from the oscillatory motion of a buoy using a single plane rocking pendulum. The generator includes a pendulum having a permanent magnet for the bob, and an arcuate member comprising a winding is positioned under the travel path of the bob. The interaction of the permanent magnet with the winding of the arcuate member generates electrical current.

There are also types of power generators that uses fluid movement to generate power such as U.S. Pat. No. 4,781,023 to Gordon, and U.S. Pat. No. 6,647,716 to Boyd. Each of these patents discloses a base anchored in a body of water. A float is connected to the base via a linkage member that translates the relative motion of the float in relation to the base into mechanical, hydraulic, or electrical power.

The relative motion between two bodies can also be used to generate electrical signals indicative of the movement between the two bodies. For instance, U.S. Pat. No. 4,344,004 to Okubo discloses a sensor for detecting the positioning of a spherical body having an electret on the surface. The sensor includes a base having a hemispherical recess therein with two electrically conductive regions. The spherical body moves on a dielectric in the hemispherical recess. The electrically conductive regions are connected to sensing circuitry that determine the positioning of the sphere based upon the interaction of the electret and the electrically conductive regions.

U.S. Pat. No. 5,450,049 also discloses a sensor for generating electrical signals indicative of the movement experienced by a body. The sensor includes a housing carrying a pendulum having a permanent magnet at the free end. Each end of a reed switch is connected to a circuit and the reed switch is positioned below the pendulum. The reed switch is responsive to the permanent magnet of the pendulum to thereby complete the circuit.

Unfortunately, the above described conventional systems may be inefficient at generating electrical power for self-powering applications for movements along multiple degrees of freedom, or for movement sensing systems.

SUMMARY OF THE INVENTION

In view of the foregoing background, it is therefore an object of the invention to provide an apparatus and related method to effectively generate electrical power, such as for self-powering applications, or to sense movement, for example.

This and other objects, features and advantages in accordance with the invention are provided by an apparatus comprising a pair of arcuate swing arms having respective opposing ends pivotally carried by a base so that the arcuate swing arms are transverse to one another and define a movable crossing point therebetween, and a body carried by the arcuate swing arms at the crossing point therebetween. More particularly, the apparatus may also include at least one electrical generator driven by relative movement between the body and the base, such as to generate electrical power or to sense movement, for example. The at least one electrical generator may be operatively connected between the base and at least one end of an arcuate swing arm. The motion of the apparatus that may be captured is not limited to a single plane and can be in any principle plane or any circular or elliptical motion.

The body may comprise a pendulum mass in some embodiments. For example, the pendulum mass may include an electrical storage battery connected to the electrical generator. This takes advantage of the typically large mass of a storage battery to also serve as the pendulum mass. In other embodiments, the body may comprise a sail responsive to a fluid flow, such as the flow of air or water, for example.

The apparatus may further include an electrical power load powered by the electrical generator. One particularly advantageous application is for a self-powered buoy. In this application, the base may be buoyant in water. In other embodiments, electrical sensing circuitry may connected to the electrical generator, such as for sensing motion of the apparatus or sensor, that causes relative motion between the base and the body.

A gear train may be operatively connected between the at least one electrical generator and the at least one end of the pair of arcuate swing arms. The gear train may provide a reduction or increase in rotation speed, and/or may provide a directional clutch so that only rotation in one direction is coupled to an electrical generator.

Each arcuate swing arm may have a semi-circular shape so that the pair of arcuate swing arms define a hemispherical range of movement for the body. In some embodiments, the at least one electrical generator comprises a respective electrical generator operatively connected between each end of the pair of arcuate swing arms and the base. In addition, the base may have an opening therein with the pair of arcuate swing arms being carried within the opening.

A method aspect is for generating an electrical signal based upon relative movement between a body and a base of an apparatus. The apparatus may further comprise a pair of arcuate swing arms having respective opposing ends pivotally carried by the base so that the arcuate swing arms are transverse to one another and define a movable crossing point therebetween with the body carried at the crossing point. The method may include driving at least one electrical generator based upon relative movement between the body and the base to thereby generate the electrical signal.

BRIEF DESCRIPTION OF THE DRAWINGS

FIGS. 2-5 are schematic front perspective views of a portion of the apparatus of FIG. 1 in four different positions.

FIG. 8A is a schematic diagram of the pendulum mass of the apparatus of FIG. 1 operating in a first motion direction.

FIG. 8B is a schematic diagram of a gear box operating in response to the pendulum mass movement illustrated in FIG. 8A.

FIG. 9A is a schematic diagram of the pendulum mass of the apparatus of FIG. 1 operating in a second motion direction.

FIG. 9B is a schematic diagram of a gear box operating in response to the pendulum mass movement illustrated in FIG. 9A.

DETAILED DESCRIPTION OF THE PREFERRED EMBODIMENTS

Figure 1:
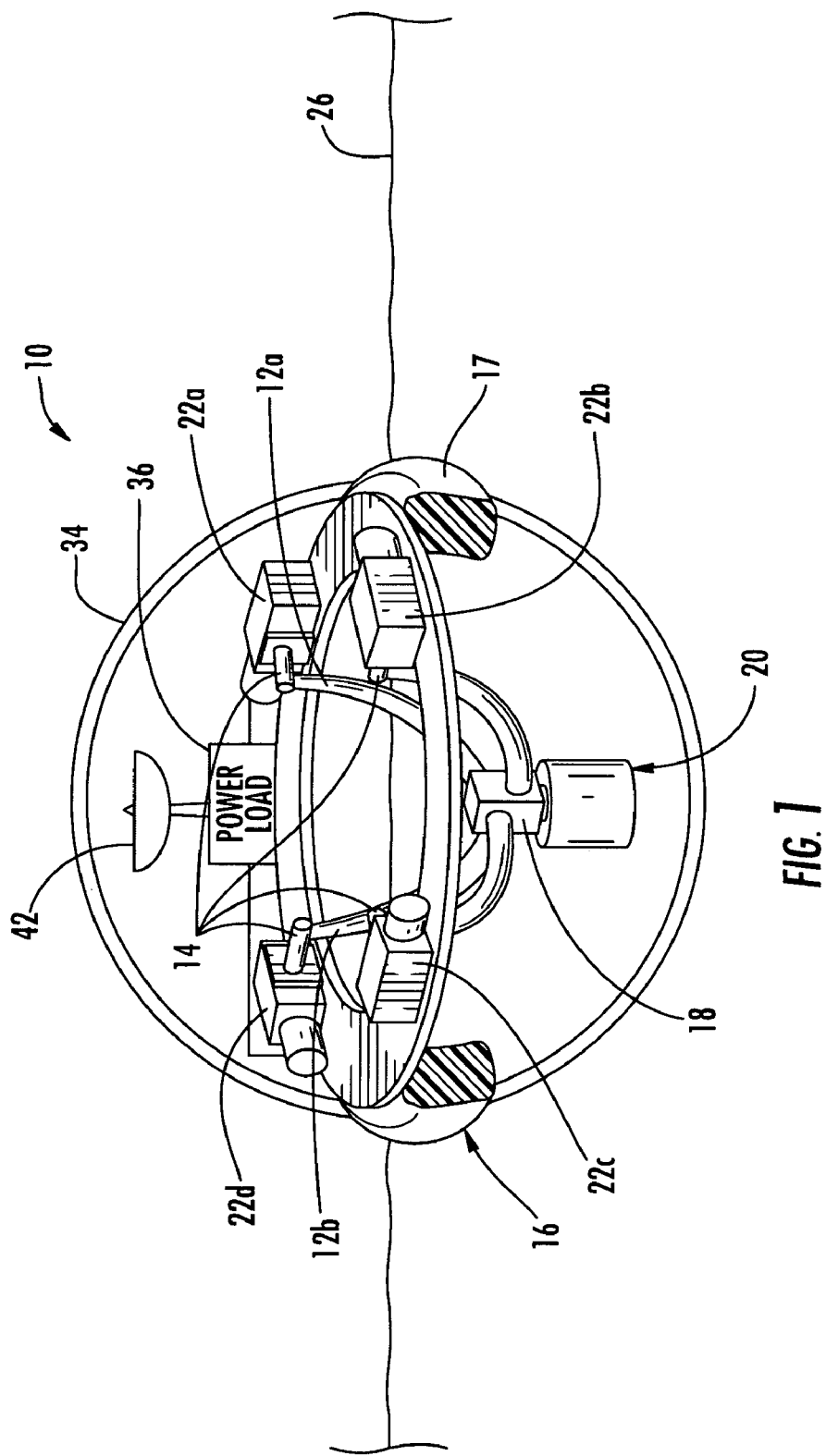
FIG. 1 is a schematic front perspective view, partially in section, of an apparatus in accordance with the invention.

The invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Referring initially to FIGS. 1-5, an apparatus in the form of a water buoy 10 for generating electrical power in accordance with the invention is now described. The buoy 10 comprises a pair of arcuate swing arms 12a, 12b having respective opposing ends 14 pivotally carried by a base 16 so that the arcuate swing arms are transverse to one another and define a movable crossing point 18 therebetween. A body in the form of a pendulum mass 20 is illustratively carried by the arcuate swing arms 12a, 12b at the crossing point 18 therebetween. More particularly, the buoy 10 also includes electrical generators 22a-22d driven by relative movement between the pendulum mass 20 and the base 16 to generate electrical power. The electrical generators 22a-22d are operatively connected between the base 16 and respective ends 14 of the arcuate swing arms 12a, 12b. The motion of the buoy 10 that may be captured is not limited to a single plane and can be in any principle plane or any circular or elliptical motion as can be seen with specific reference to FIGS. 2-5. The buoy 10 efficiently generates electrical power for movements along multiple degrees of freedom for self-powering applications or movement sensing systems.

The buoy 10 further illustratively includes an electrical power load 36 powered by the electrical generators 22a-22d. The power load 36 may comprise a transceiver, not shown, connected to an antenna 42, although other power loads such as signal lights, communications equipment, and the like may provide part of the power load.

Each arcuate swing arm 12a, 12b has a semi-circular shape so that the pair of arcuate swing arms defines a hemi-spherical range of movement for the pendulum 20, for example. Other shapes are also contemplated as would be appreciated by those of skill in the art. In other embodiments, less than four, or more than four, electrical generators 22a-22d may be provided. The base 16 illustratively has an opening 50 therein with the pair of arcuate swing arms 12a, 12b being carried within the opening.

Figure 6:
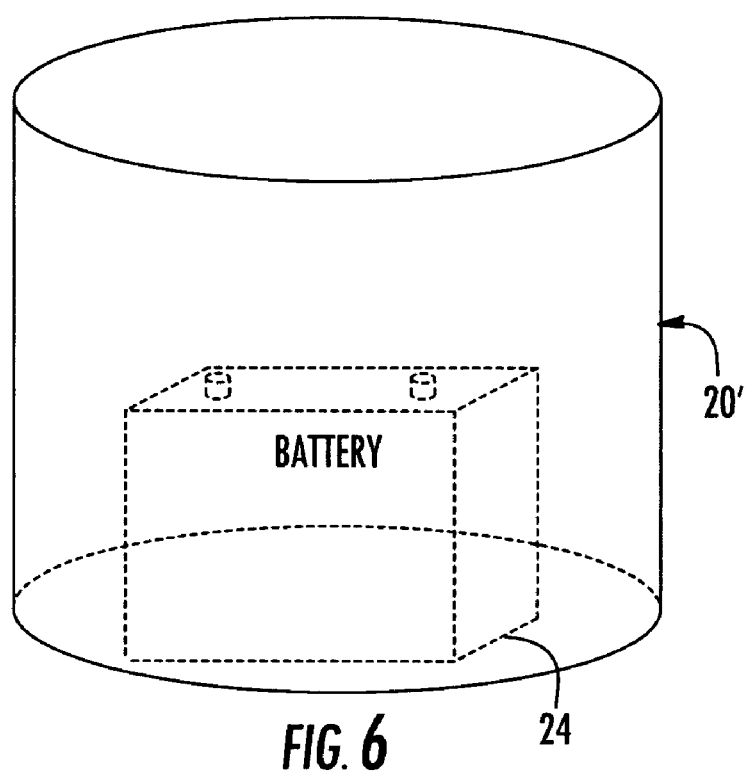
FIG. 6 is a schematic front perspective view of an alternative embodiment of the pendulum mass in FIG. 1.

As understood with additional reference to FIG. 6, the pendulum mass 20' may include an electrical storage battery 24 to be connected to the electrical generators 22a-22d (FIG. 1). This takes advantage of the typically large mass of a storage battery 24 to also serve as the pendulum mass 20'.

One particularly advantageous application of the apparatus is for the self-powered buoy 10 as illustrated in FIG. 1. In this application, the base 16 may be rendered buoyant in water 26 by the addition of floatation material 17 carried by the base in the illustrated embodiment as will be appreciated by those of skill in the art. The illustrated buoy 10 also comprises a sealed housing 34 for protecting the components of the buoy from environmental damage, for example. As will be appreciated by those of skill in the art, other embodiments may not use the fully sealed housing 34.

Figure 7:
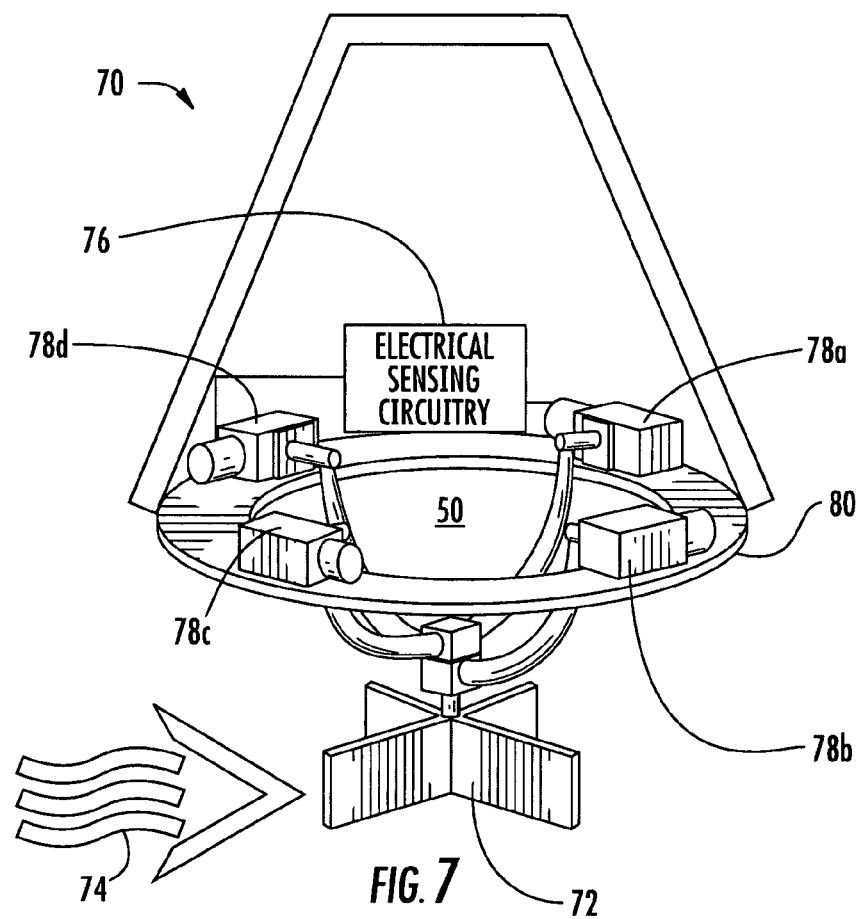
FIG. 7 is a schematic front perspective view of an alternative embodiment of the apparatus in accordance with the invention.

Referring now additionally to FIG. 7, the apparatus of the invention is in the form of a fluid flow sensor 70 wherein the body is in the form of a sail 72 responsive to a fluid flow 74. The sail 72 is illustrated to have four blades, but other sail configurations are also possible as will be appreciated by those of skill in the art. The fluid flow 74 may be the flow of air or water, for example. In the case of air as the fluid flow 74, the sensor 70 may be suspended from a frame and the sail 72 is exposed to the fluid flow 74.

Electrical sensing circuitry 76 is illustratively connected to electrical generators 78a-78d, such as for sensing motion of the sail 72 in relation to the base 80. The electrical sensing circuitry 76 may provide at least one of an accelerometer function, a rate sensor function, and an angular inclinometer function. The electrical sensing circuitry 76 may be used in conjunction with the pendulum mass 20 embodiments as described with reference to FIGS. 1-6. In addition, conversely the embodiments including the sail 72 may be used to generate electrical power for a load as will be appreciated by those of skill in the art.

Referring now additionally to FIGS. 8A-9B, the generator 22a is operatively connected to a continuous rotation gear box 40. The gear box 40 may provide an increase in rotational speed between the end 14 of the swing arm 12a and the generator 22a, and may provide directional clutches 48a, 48b so that only rotation in one direction is coupled to the electrical generator 22a.

When the end 14 experiences a torque due to the movement of the pendulum 20 in a first direction as illustrated in FIG. 8A, then the lower clutch 48b of FIG. 8B slips and the upper clutch 48a engages the gear train 46. Conversely in FIG. 9A, when the end 14 experiences a torque due to the movement of the pendulum 20 in a second or opposite direction, the upper clutch 48a slips and the lower clutch 48a engages the gear train 46. In both cases, the gear train 46 is connected to the generator 22a and the movement of the gear train causes the generator to produce an electrical signal as will be appreciated by those of skill in the art.

A method aspect is for generating an electrical signal based upon relative movement between a body and a base of an apparatus. The apparatus may further comprise a pair of arcuate swing arms having respective opposing ends pivotally carried by the base so that the arcuate swing arms are transverse to one another and define a movable crossing point therebetween with the body carried at the crossing point as described above. The method may include driving at least one electrical generator based upon relative movement between the body and the base to thereby generate the electrical signal.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that other modifications and embodiments are intended to be included within the scope of the appended claims.

That which is claimed is:

1. An apparatus comprising:
   a base;
   a pair of arcuate swing arms having respective opposing ends pivotally carried by said base so that said arcuate swing arms are transverse to one another and define a movable crossing point therebetween;
   a body carried by said pair of arcuate swing arms at the crossing point therebetween; and
   at least one electrical generator driven by relative movement between said body and said base.

2. The apparatus according to claim 1 wherein said at least one electrical generator is operatively connected between said base and at least one end of said pair of arcuate swing arms.

3. The apparatus according to claim 1 wherein said body comprises a pendulum mass.

4. The apparatus according to claim 3 wherein said pendulum mass comprises an electrical storage battery connected to said electrical generator.

5. The apparatus according to claim 1 wherein said body comprises a sail responsive to a fluid flow.

6. The apparatus according to claim 1 wherein said base is buoyant in water.

7. The apparatus according to claim 1 further comprising an electrical power load powered by said at least one electrical generator.

8. The apparatus according to claim 1 further comprising electrical sensing circuitry connected to said electrical generator.

9. The apparatus according to claim 1 further comprising a gear train operatively connected between said at least one electrical generator and the at least one end of said pair of arcuate swing arms.

10. The apparatus according to claim 1 wherein each arcuate swing arm has a semi-circular shape so that said pair of arcuate swing arms define a hemi-spherical range of movement for said body.

11. The apparatus according to claim 1 wherein said at least one electrical generator comprises a respective electrical generator operatively connected between each end of said pair of arcuate swing arms and said base.

12. The apparatus according to claim 1 wherein said base has an opening therein; and wherein said pair of arcuate swing arms are carried within the opening.

13. A method for generating an electrical signal based upon relative movement between a body and a base of an apparatus further comprising a pair of arcuate swing arms having respective opposing ends pivotally carried by the base so that the arcuate swing arms are transverse to one another and define a movable crossing point therebetween with the body carried at the crossing point, the method comprising:
   driving at least one electrical generator based upon relative movement between the body and the base to thereby generate the electrical signal.

14. The method according to claim 13 wherein driving comprises operatively connecting the at least one electrical generator between the base and at least one end of the pair of arcuate swing arms.

15. The method according to claim 13 wherein the body comprises a pendulum mass; and wherein driving comprises moving the apparatus in a gravitational field.

16. The method according to claim 13 wherein the pendulum mass comprises an electrical storage battery connected to the electrical generator; and further comprising charging the electric storage battery from the electrical generator.

17. The method according to claim 13 wherein the body comprises a sail; and wherein driving comprises exposing the sail to a fluid flow.

18. The method according to claim 13 wherein the apparatus further comprises an electrical power load; and further comprising powering the electrical power load from the at least one electrical generator.

19. The method according to claim 13 wherein the apparatus further comprises electrical sensing circuitry connected to the at least one electrical generator; and further comprising performing sensing using the electrical sensing circuitry.

* * * * *

UNITED STATES PATENT AND TRADEMARK OFFICE
CERTIFICATE OF CORRECTION

PATENT NO.       : 7,239,038 B1                                           Page 1 of 1
APPLICATION NO.  : 11/303346
DATED            : July 3, 2007
INVENTOR(S)      : Zimmerman et al.

It is certified that error appears in the above-identified patent and that said Letters Patent is hereby corrected as shown below:

Title Page, Section 56        Insert -- US 2007/0138793 A1 June 21, 2007 --

Signed and Sealed this

Eighth Day of April, 2008

JON W. DUDAS
*Director of the United States Patent and Trademark Office*